US006762928B2

United States Patent
Lo

(10) Patent No.: US 6,762,928 B2
(45) Date of Patent: Jul. 13, 2004

(54) AUTOMATIC LIFTING APPARATUS FOR LIQUID CRYSTAL DISPLAY MODULE OF NOTEBOOK COMPUTER

(75) Inventor: Chao-Yuan Lo, Tu Chen (TW)

(73) Assignee: Quanta Computer Inc., Taoyuan Hsien (TW)

( * ) Notice: Subject to any disclaimer, the term of this patent is extended or adjusted under 35 U.S.C. 154(b) by 29 days.

(21) Appl. No.: 10/222,993

(22) Filed: Aug. 19, 2002

(65) Prior Publication Data

US 2004/0032708 A1 Feb. 19, 2004

(51) Int. Cl.$^7$ ................................................ G06F 1/16
(52) U.S. Cl. ...................... 361/681; 361/683; 292/102; 292/106
(58) Field of Search ................................ 361/680, 681, 361/684, 683, 732, 726, 740; 292/63, 64, 128, 163, 341.17, 175, DIG. 72, 145, 164; 220/256, 326; 312/216, 227, 223.2, 291; 364/708.1

(56) References Cited

U.S. PATENT DOCUMENTS 5,465,191 A * 11/1995 Nomura et al. ............. 361/681
5,576,929 A * 11/1996 Uchiyama et al. .......... 361/680
6,108,196 A * 8/2000 Jung ......................... 361/683

* cited by examiner

Primary Examiner—Michael Datskovsky

(57) ABSTRACT

An automatic lifting apparatus for a liquid crystal display module of notebook computers is described. The automatic lifting apparatus comprises a latch hook, a latch button, a latch spring, a lifting plate, at least one lifting spring, and a housing. The latch hook fixes on a liquid crystal display module of the notebook computer. The others parts are positioned inside a base of the notebook computer for locking the latch hook. Furthermore, the lifting plate with the lifting spring power pushes the latch hook moving upward until the latch hook reaches about the height of the latch hook. Therefore, the automatic lifting apparatus can open the liquid crystal display module more efficiently and easily.

12 Claims, 3 Drawing Sheets

AUTOMATIC LIFTING APPARATUS FOR LIQUID CRYSTAL DISPLAY MODULE OF NOTEBOOK COMPUTER

FIELD OF THE INVENTION

The present invention relates to notebook computers and especially to an automatic lifting apparatus for a liquid crystal display module in notebook computers.

BACKGROUND OF THE INVENTION

Notebook computers are widely used in business, for leisure and many other purposes. Current notebook computer functions are increasingly powerful and multimedia applications are an important feature of the notebook computer. Liquid crystal display (LCD) has many advantages over other conventional types of displays; they have a high picture quality, occupy less space, are lightweight, are low voltage driven and consume little power. Hence, LCDs are widely used in notebook computers.

Notebook computers comprise a base and a liquid crystal display module pivotally connected to the base with a pivoting connector. When the notebook computer is in use, the liquid crystal display module is opened and the liquid crystal display panel mounted therein is exposed. The liquid crystal display module is latched to the base when the notebook computer is in a closed position. The latch of the notebook computer normally uses a sliding switch to secure the liquid crystal display module. A sliding switch needs a flat surface to function properly but modern notebook computers increasingly incorporate streamlined or other identifying shapes in their design. The non-flat shape results in difficulty in mounting the sliding switch on the LCD module and in opening the same.

Another inconvenience is that even if the latch releases a latch hook on the liquid crystal display module the liquid crystal display module may remain in the closed position. The liquid crystal display module needs an additional upward force to open it. Therefore, the liquid crystal display module or the base needs a mold design for ease in opening the liquid crystal display module. For example, the liquid crystal display module has a flange or the base has a concave shape to make a suitable modeling on covers of the notebook computer to open the liquid crystal display module. However, the flange or the concave shape make a mold for the case of the notebook computer more complex and result in inconsistent modeling.

SUMMARY OF THE INVENTION

An object of the invention is to provide an automatic lifting apparatus for a liquid crystal display module of notebook computers, which automatic lifting apparatus opens the LCD module automatically and easily and does not influence the LCD module while the notebook computer is in use. In addition, a larger LCD panel can be installed in the LCD module.

In a first aspect, the invention provides a notebook computer with an automatic lifting apparatus to open a liquid crystal display module. The notebook computer comprises a liquid crystal display module with a latch hook, a base, a pivoted connector, and the automatic lifting apparatus. The base includes an opening allowing the latch hook to pass through. The automatic lifting apparatus locks the liquid crystal display module while the liquid crystal display module of the notebook computer is closed, and the automatic lifting apparatus pushes the liquid crystal display module to a predetermined distance while the liquid crystal display module of the notebook computer is being opened.

Furthermore, the automatic lifting apparatus comprises a latch button, a latch spring, a lifting plate, at least one lifting spring, and a housing. The latch button locks the latch hook while the liquid crystal display module is closed and the latch button is moved forward, and the latch button unlocks the latch hook when the liquid crystal display module is opened and the latch button is moved backward. The latch spring pushes the latch button forward. The lifting plate is positioned inside the latch button with an interval and pushes the latch hook moving upward. The lifting spring pushes the lifting plate forward. The housing covers and protects the latch button, the latch spring, the lifting plate, and the lifting spring. The housing directly supports the lifting spring. The base further comprises at least one guide pin to guide the lifting plate and the lifting spring while the lifting plate is moving. The automatic lifting apparatus pushes the latch hook until the liquid crystal display module is opened to about the height of the latch hook. Then, the latch hook separates from the automatic lifting apparatus.

In a second aspect, the invention provides an automatic lifting apparatus for a liquid crystal display module of a notebook computer. The automatic lifting apparatus comprises a latch hook, a latch button, a latch spring, a lifting plate, at least one lifting spring, and a housing. The latch hook fixes on a liquid crystal display module of the notebook computer. The latch button is positioned inside of a base of the notebook computer for locking the latch hook, in which the latch button locks the latch hook while the liquid crystal display module of the notebook computer is closed and the latch button is moved forward, and the latch button unlocks the latch hook when the liquid crystal display module of the notebook computer is opened and the latch button is moved backward. The latch spring pushes the latch button forward. The lifting plate is positioned inside the latch button with an interval, and pushes the latch hook upward until the latch hook is at about the height of the latch hook while the latch button is moved backward. The lifting spring pushes the lifting plate forward. The housing covers and protects the latch button, the latch spring, the lifting plate, and the lifting spring. The housing directly supports the lifting spring and is fixed inside the base. The automatic lifting apparatus further comprises at least one guide pin to guide the lifting plate and the lifting spring while the lifting plate is moving.

It is to be understood that both the foregoing general description and the following detailed description are exemplary, and are intended to provide further explanation of the invention as claimed.

BRIEF DESCRIPTION OF THE DRAWINGS

The foregoing aspects and many of the attendant advantages of this invention are more readily appreciated as the same becomes better understood by reference to the following detailed description, when taken in conjunction with the accompanying drawings, wherein.

DETAILED DESCRIPTION OF THE PREFERRED EMBODIMENT

Figure 1:
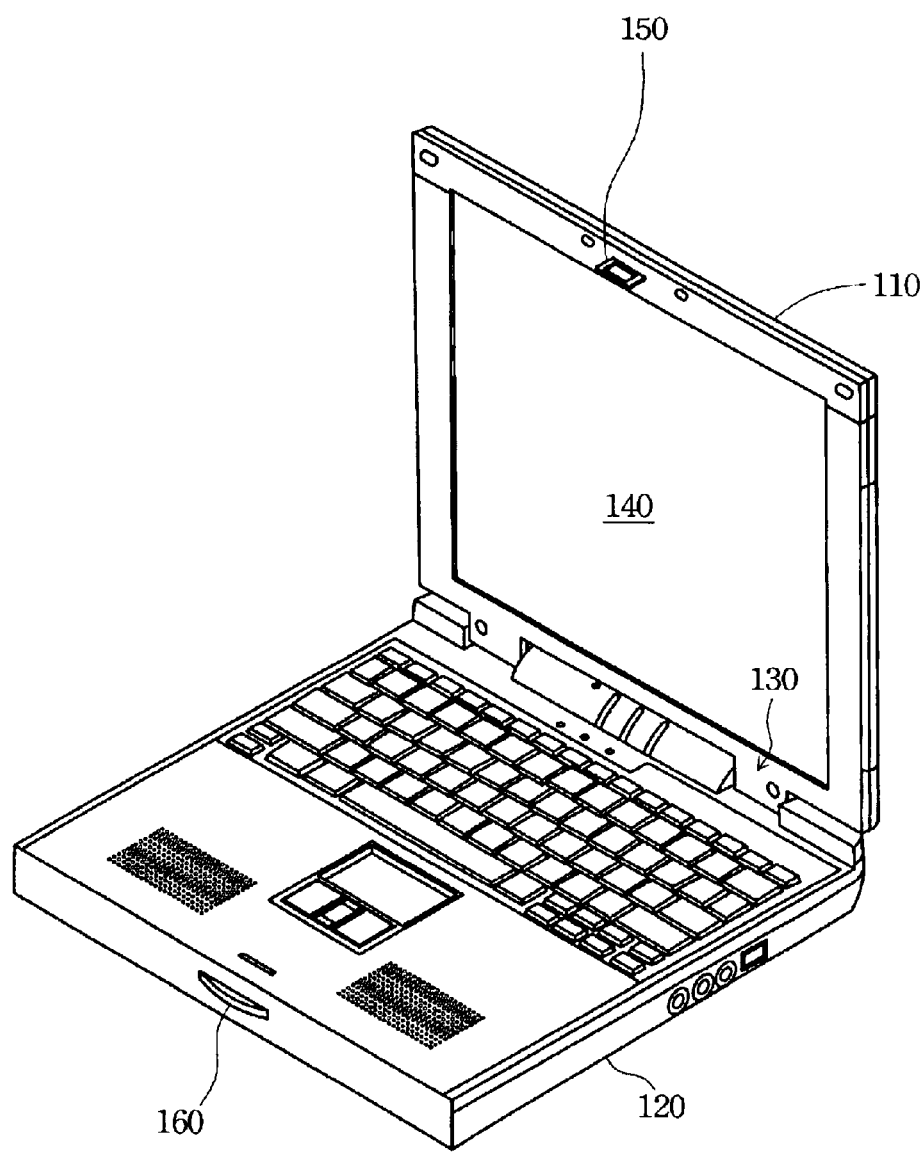
FIG. 1 is a diagrammatic view illustrating a notebook computer with an automatic lifting apparatus according to the present invention.

Referring to FIG. 1, a notebook computer with an automatic lifting apparatus according to the present invention is illustrated. The notebook computer has a liquid crystal display module 110 with a liquid crystal display panel 140 and a latch hook 150, a base 120, and a pivoted connector 130 coupling the liquid crystal display module 110 and the base 120. Furthermore, the base 120 comprises an automatic lifting apparatus 160 with a latch function while the liquid crystal display module 110 is closed and another function for automatic lifting of the liquid crystal display module 110 a predetermined distance when the latch hook 150 is released. The predetermined distance makes the liquid crystal display module 110 easy to open. Accordingly, the LCD panel 140 is efficiently adjusted to a comfortable position for use.

Figure 2:
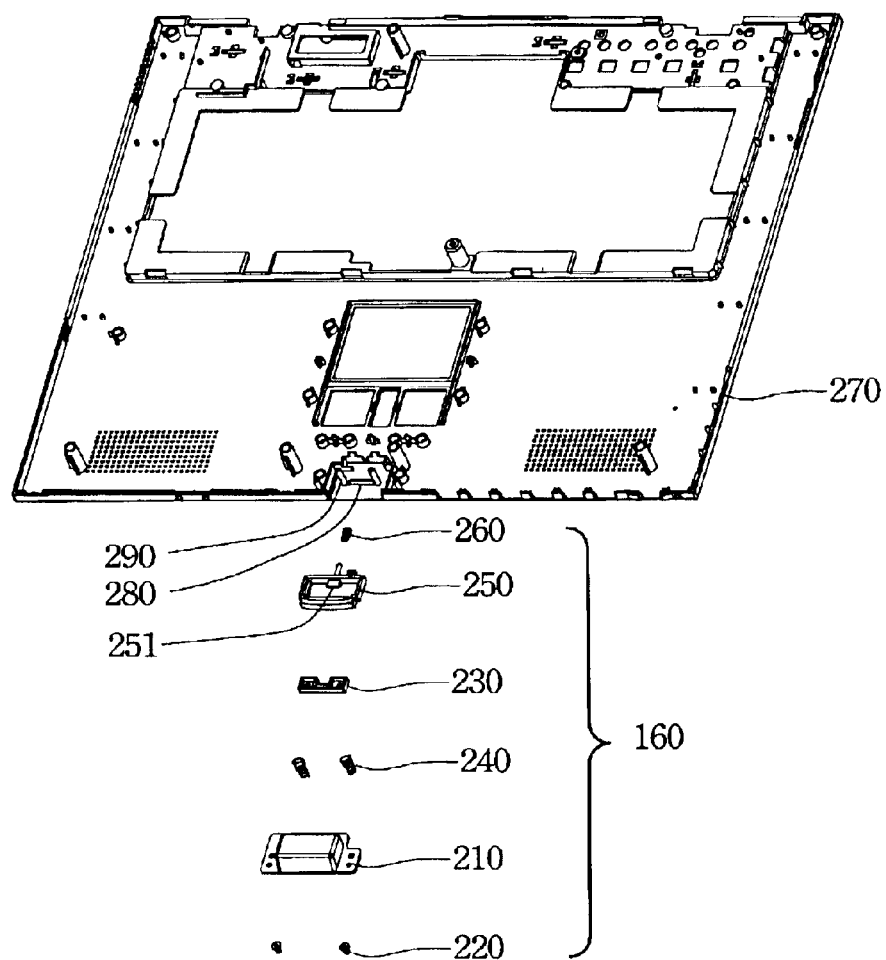
FIG. 2 is a diagrammatic developed view of a portion of the automatic lifting apparatus according to the present invention.
Figure 3:
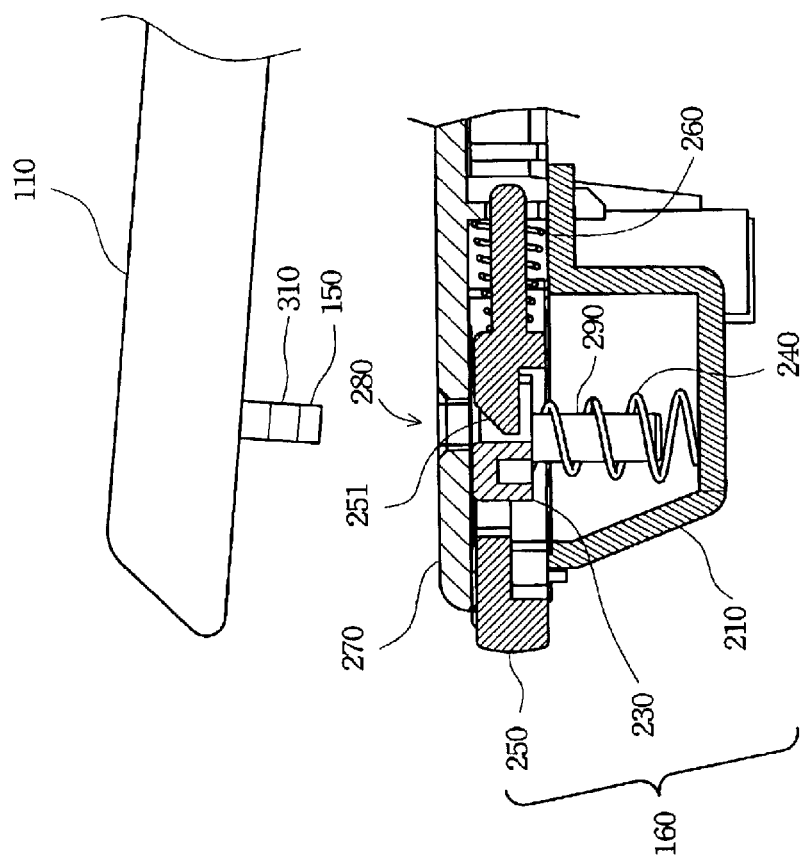
FIG. 3 is a detailed cross-sectional view of a portion of the automatic lifting apparatus according to the present invention.

FIG. 2 is a diagrammatic developed view of a portion of the automatic lifting apparatus according to the present invention, and FIG. 3 is a detailed cross-sectional view of a portion of the automatic lifting apparatus according to the present invention. Referring to FIG. 2 and FIG. 3 simultaneously, an embodiment of the automatic lifting apparatus 160 according to the present invention is described herein with more detail. The automatic lifting apparatus 160 comprises a housing 210, two fixing devices 220 such as screws or dowel pins, a latch button 250, a lifting device including a lifting plate 230 positioned inside the latch button 250 with an interval and two lifting springs 240, and a latch spring 260. In particular, in the base 120, the under side of a base cover 270 includes an opening 280 allowing the latch hook 150 on the LCD module 110 to pass through the base cover 270 and lock in the automatic lifting apparatus 160. Two guide pins 290 guide the movements of the lifting plate 230 and the two lifting springs 240 while the LCD module 110 is closing or opening.

To close the LCD module 110, the latch hook 150 on the LCD module 110 is pressed to pass through the opening 280 in the base cover 270, the latch hook 150 presses the lifting plate 230 downward and the latch button 250 moves backward until the LCD module 110 is closed. After the LCD module 110 is closed, the latch hook 150 reaches a position allowing a lock piece 251 of the latch button 250 to pass through the hole 310, which is set on the latch hook 150. Accordingly, the latch button 250 moves forward and the lock piece 251 locks the latch hook 150.

To open the LCD module 110, the latch button 250 is pressed and the latch button 250 moves backward. Therefore, the lock piece 251 withdraws from the hole 310 and releases the latch hook 150. Compression of lifting springs 240 stores spring power therein. Hence, as the lock piece 251 releases the latch hook 150, the lifting plate 230 pushes the latch hook 150 up with the spring power. Finally, the LCD module 110 is pushed upward a predetermined distance. The notebook computer can be easily opened and the LCD module can reach any suitable position easily and efficiently. The predetermined distance is around the height of the latch hook 150, and depends upon the resilient force of the lifting springs 240. When the LCD module is opened to the predetermined distance or more, the automatic lifting apparatus stops pushing the latch hook. That is to say, the automatic lifting apparatus has no influence while the notebook computer is in use and the LCD module is open. Further, the automatic lifting apparatus and the latch hook are positioned at an opening end of the notebook computer. Therefore, the automatic lifting apparatus needs the smallest force to open the LCD module. Furthermore, since the latch hook is a small element on the LCD module, a larger LCD panel can be installed in the LCD.

The present invention discloses an automatic lifting apparatus for a liquid crystal display module of notebook computers. The liquid crystal display module of the notebook computer is easily opened by the automatic lifting apparatus. A preferred embodiment is provided to describe the present invention in greater detail. As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A notebook computer with an automatic lifting apparatus to open a liquid crystal display module, the notebook computer comprising:

a liquid crystal display module including a latch hook thereon;

a latch button for locking the latch hook, wherein:
the latch button locks the latch hook while the liquid crystal display module is closed and the latch button is moved forward; and
the latch button unlocks the latch hook while the liquid crystal display module is being opened and the latch button is moved backward;

a latch spring coupling with the latch button, the latch spring pushing the latch button forward;

a lifting plate positioned inside the latch button with an interval, the lifting plate pushing the latch hook upward;

at least one lifting spring coupling below the lifting plate, the lifting spring pushing the lifting plate forward; and a housing covering the latch button, the latch spring, the lifting plate, and the lifting spring, wherein the housing directly supports the lifting spring and is fixed inside the base.

2. The notebook computer of claim 1, wherein the housing is fixed inside the base by a fixing device.

3. The notebook computer of claim 2, wherein the fixing device comprises a screw.

4. The notebook computer of claim 2, wherein the fixing device comprises a dowel pin.

5. The notebook computer of claim 1, wherein the base further comprises at least one guide pin to guide the lifting plate and the lifting spring while the lifting plate is moving.

6. An automatic lifting apparatus for a liquid crystal display module of a notebook computer, the automatic lifting apparatus comprising:

a latch hook fixed on the liquid crystal display module of the notebook computer;

a latch button positioned inside of a base of the notebook computer for locking the latch hook, wherein:
the latch button locks the latch hook while the liquid crystal display module of the notebook computer is closed and the latch button is moved forward; and
the latch button unlocks the latch hook when the liquid crystal display module of the notebook computer is being opened and the latch button is moved backward;

a latch spring coupling with the latch button, the latch spring pushing the latch button forward;

a lifting plate positioned inside the latch button with an interval, the lifting plate pushing the latch hook upward, wherein the lifting plate pushes the latch hook upward to a predetermined distance when the latch button is moved backward;

at least one lifting spring coupling below the lifting plate, the lifting spring pushing the lifting plate forward; and a housing covering the latch button, the latch spring, the lifting plate, and the lifting spring, wherein the housing directly supports the lifting spring and is fixed inside the base.

7. The automatic lifting apparatus of claim 6, wherein the housing is fixed inside the base by a fixing device.

8. The automatic lifting apparatus of claim 7, wherein the fixing device comprises a screw.

9. The automatic lifting apparatus of claim 8, wherein the fixing device comprises a dowel pin.

10. The automatic lifting apparatus of claim 6, wherein the automatic lifting apparatus further comprises at least one guide pin to guide the lifting plate and the lifting spring while the lifting plate is moving.

11. The automatic lifting apparatus of claim 6, wherein the predetermined distance is about a height of the latch hook.

12. The automatic lifting apparatus of claim 6, wherein the latch hook separates with the lifting plate as the latch hook is moved more than the predetermined distance.

* * * * *